(12) United States Patent
Kunhappan et al.

(10) Patent No.: US 7,843,821 B2
(45) Date of Patent: Nov. 30, 2010

(54) METHOD, APPARATUS AND PROGRAM PRODUCT TO USE FACTORY-DEFINED MULTIPLE MAC ADDRESSES FOR VIRTUAL NICS

(75) Inventors: Rajagopal Kunhappan, Fremont, CA (US); Kais Belgaied, Sunnyvale, CA (US); Eric T. Cheng, San Mateo, CA (US)

(73) Assignee: Oracle America, Inc., Redwood Shores, CA (US)

( * ) Notice: Subject to any disclaimer, the term of this patent is extended or adjusted under 35 U.S.C. 154(b) by 401 days.

(21) Appl. No.: 11/644,561

(22) Filed: Dec. 21, 2006

(65) Prior Publication Data

US 2008/0155069 A1 Jun. 26, 2008

(51) Int. Cl.
*G01R 31/08* (2006.01)
*G06F 11/00* (2006.01)
*G06F 9/455* (2006.01)
*G06F 15/16* (2006.01)
*G06F 9/26* (2006.01)
*G06F 9/34* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. .................... 370/230; 370/409; 703/23; 709/229; 711/203

(58) Field of Classification Search ................. 370/397, 370/399, 409, 419, 230; 703/23; 711/203; 709/229
See application file for complete search history.

(56) References Cited

U.S. PATENT DOCUMENTS

| | | | |
|---|---|---|---|
| 7,020,716 B2 * | 3/2006 | Raval et al. | 709/237 |
| 2003/0069993 A1 * | 4/2003 | Na et al. | 709/245 |
| 2004/0240440 A1 * | 12/2004 | Wild et al. | 370/389 |
| 2005/0111483 A1 * | 5/2005 | Cripe et al. | 370/463 |
| 2005/0163123 A1 * | 7/2005 | Gangadharan | 370/392 |
| 2005/0286503 A1 * | 12/2005 | Oda et al. | 370/355 |
| 2006/0045089 A1 * | 3/2006 | Bacher et al. | 370/392 |
| 2006/0187928 A1 * | 8/2006 | McGee et al. | 370/390 |
| 2008/0002739 A1 * | 1/2008 | Droux et al. | 370/468 |
| 2008/0123676 A1 * | 5/2008 | Cummings et al. | 370/419 |

* cited by examiner

*Primary Examiner*—John Pezzlo
*Assistant Examiner*—Jeremy Costin
(74) *Attorney, Agent, or Firm*—Park, Vaughan, Fleming & Dowler LLP (57) ABSTRACT

Apparatus, methods and computer program products are disclosed for specifying a MAC identifier for a network-interface-device that includes multiple universally administered MAC identifiers and connects to a network through a port. The network-interface-device accepts data packets received through the port if the data packets contain a destination address that matches any active MAC identifier. The method includes reserving a first and second universally administered MAC identifiers from the available universally administered MAC identifiers. The first universally administered MAC identifier and the second universally administered MAC identifier are respectively associated with a first and second resource of the network-interface-device. The MAC identifier is assigned to one of the first or second resource and activated. Other aspects include apparatus logics and program products that perform the method.

22 Claims, 8 Drawing Sheets

METHOD, APPARATUS AND PROGRAM PRODUCT TO USE FACTORY-DEFINED MULTIPLE MAC ADDRESSES FOR VIRTUAL NICS

BACKGROUND

1. Technical Field

The disclosed technology relates to the field of computer devices and resources.

2. Background Art

Networked systems exchange information across a network by sending data packets that encapsulate the information being exchanged. These data packets generally include a unique destination address or identifier for the data packet's destination (destinations for multicast and broadcast packets). The uniqueness of the address/identifier is in accordance with the definitions of MAC-48, EUI-48™ and EUI-64™ as defined/used in networking standards known to one skilled in the art. Networked systems require that the address/identifier be unique so that the data packet can be directed to its intended destination. The data packet also contains a source address/identifier to identify which device/resource emitted the data packet onto the network. One skilled in the art will understand that there are additional details related to broadcast and multicast data packets.

Each address/identifier that complies with the previously referenced definitions comprises two primary fields. The first field is a 24-bit identifier often referred to as an "organizationally unique identifier" (OUI) which is uniquely assigned by the IEEE Registration Authority to a requesting organization (such as a networking device manufacturer). The requesting organization is responsible maintaining uniqueness by providing unique values for the second field (which is the "extension identifier"). The address/identifier is a concatenation of these two fields. The address/identifier is permanently (or semi-permanently) installed into a networking device or permanently (or semi-permanently) associated with a specific service and is termed a "universally administered MAC identifier" or a "burned-in address/identifier" (because the universally administered MAC identifier is commonly "burned-into" a read-only-memory installed in a network interface card (NIC) or other "network-interface-device").

The MAC-48 and EUI-48 definitions are syntactically indistinguishable from one another and are assigned from the same numbering space. The EUI-64 definition uses an expanded numbering space that provides an expansion of the currently available address/identifiers. MAC-48, EUI-48™ and EUI-64™ are commonly referred to as the "Media Access Control (MAC) address", the "MAC identifier", the "hardware address", the "Ethernet address", etc.

For the rest of this disclosure, the term "MAC identifier" is used to mean any address/identifier that is used to identify a specific device or service on a network. One skilled in the art will understand that the terms "MAC address" and "MAC identifier" are equivalent, can be used interchangeably, and that for the rest of this document the use of one implies the use of the other.

The MAC identifier can be used by the "layer 2" networking protocols. On the Internet, the Address Resolution Protocol (ARP) converts an address in a layer 3 protocol (for example, an IP address) to a MAC identifier.

A "locally administered MAC identifier" is assigned to a device by a network administrator, and overrides the universally administered MAC identifier (the "burned-in" address). Locally administered MAC identifiers should not contain organizationally unique identifiers assigned by the IEEE (but see the subsequent discussion on "cloning"). Locally administered MAC identifiers are distinguished from universally administered MAC identifiers by a bit in the MAC identifier.

A typical host network-interface-device includes a burned-in MAC identifier. The burned-in MAC identifier is inserted into the "source" field of a data packet when the data packet is transmitted by the host network-interface-device. Furthermore, the host network-interface-device will examine all the data packets it receives and if the destination address/identifier in the data packet matches the burned-in MAC identifier, the host network-interface-device will accept the information within the data packet. Generally, the host network-interface-device will not accept data packets unless they are specifically addressed to the host network-interface-device, addressed as a multicast recognized by the host network-interface-device, or as a broadcast. However, the host network-interface-device can be conditioned to be in promiscuous mode so that all data packets seen by the host network-interface-device are provided to the next protocol level and the host network-interface-device provides no data packet filtering. Data packets sent by the host network-interface-device contain the host network-interface-device's active MAC identifier in the source field of the data packet.

For the rest of this disclosure, the term "burned-in MAC identifier" refers to the universally administered MAC identifier; the term "active MAC identifier" refers to the MAC identifier that is transmitted and/or recognized by a networking device or service; and the term "spoofed/cloned MAC identifier" refers to a universally administered MAC identifier that is not the universally administered MAC identifier assigned to the network interface card by the device's manufacturer, or a universally administered MAC identifier of another network-interface-device (and the like).

There are situations where it is useful for the active MAC identifier to be other than the burned-in MAC identifier (a universally administered MAC identifier). Some devices allow the burned-in MAC identifier to be changed. However, it is more common to "clone" the MAC identifier by providing the device with a capability of accepting and using a universally administered MAC identifier other than the universally administered MAC identifier provided by the device's manufacturer. There are numerous reasons why the ability to specify the MAC identifier is useful. These reasons include providing support for Layer 2 authentication in a firewall system (where the firewall monitors specific locally administered MAC identifiers that are periodically changed). Changing the MAC identifier is also useful when modifying a network if, for example, an internet service provider registers the universally administered MAC identifier of the device that directly connects to the ISP. Thus, if a user changes the ISP connection device, the user either must re-register the universally administered MAC identifier of the changed connection device with the ISP or clone the universally administered MAC identifier of the prior device in the changed connection device.

Turning now to difficulties related to MAC identifiers when used within some virtualized computing environments. One example of a virtualized computing environment includes a host computer system that executes an operating system (that can be a commonly used operating system such as Solaris®, LINUX® or Microsoft Windows XP®) and/or a specialized virtualization operating system such as a hypervisor or other "virtual machine monitor". The host operating system or hypervisor manages the host computer's resources. The hypervisor can also mimic the hardware of a second computer system (using any one or combination of techniques known to one skilled in the art) such that installing the operating system on a virtual machine appears to be identical to installing on an actual physical computer.

A "virtual machine monitor" generally is an application program that executes subject to the host operating system and mimics the hardware of a second computer system whereas a hypervisor generally is an operating system that directly provides virtualization support for virtual computers. Both approaches provide a virtualized computing environment and this document uses the terms interchangeably.

The virtualized computing environment enables a host computer system to emulate other systems. For example, a computer manufactured by SUN Microsystems that is executing the Solaris® operating system and a hypervisor application can simultaneously execute programs in the host environment and at the same time mimic a processor (such as one manufactured by Intel Corporation) that is executing applications that use a windowing operating system (such as one provided by Microsoft Corporation) in a guest environment; and at the same time can also mimic a processor manufactured by Sun Microsystems that executes an unstable research operating system that is prone to crash the emulated system; all without disruption to the other virtualized computing environments executing in the real host computer. Thus, critical errors in one virtualized computing environment that crash the virtual computer will not impact the other virtualized computing environments.

The virtual computers have one or more virtual network-interface-devices. A single host network-interface-device can be carved into multiple virtual network-interface-devices each needing its own MAC identifier. The virtual network-interface-devices behave just like any other real (non-virtual) NIC for the rest of the system. NIC vendors are beginning to provide host network-interface-devices that have multiple universally administered MAC identifiers.

One difficulty when using a host network-interface-device in a host computer environment where that host network-interface-device is used to support guest environments is that the traditional host network-interface-device only has one MAC identifier. Thus, without more, each guest environment as well as the host environment uses the same MAC identifier—and require significant out-of-protocol processing to determine the actual destination for the data packet.

One way this problem is addressed is by configuring the virtual network-interface-device with a locally administered MAC identifier which is then used for emitting data packets through the network-interface-device, and placing the host network-interface-device into promiscuous mode (which allows all incoming data packets to be accepted by the host) and distributing the received data packets to the appropriate virtual NIC in accordance with the MAC identifier in the destination field of the data packet.

There are a number of difficulties that arise when the host network-interface-device is operated in promiscuous mode. These include, but are not limited to, performance impacts on the host computer because each data packet on the network must be examined by a higher protocol layer as the NIC does not filter any data packet; and security impacts because each data packet is copied into computer memory and thus jeopardizes network security (for example a malicious user or administrator could capture passwords etc.). Furthermore, the use of locally administered MAC identifiers increases the possibility of network address conflicts if the local administrator should make a mistake in assigning MAC identifiers.

It would be advantageous to allow virtual network-interface-devices to reserve and use universally administered MAC identifiers provided with a suitably equipped network interface card.

DETAILED DESCRIPTION

One aspect of the technology disclosed herein teaches a method for specifying a MAC identifier for a network-interface-device configured to connect to a network through a port. The network-interface-device includes multiple universally administered MAC identifiers and can accept data packets received through the port responsive to whether the data packets contain a destination address matching any active MAC identifier. The method includes reserving a first universally administered MAC identifier from the multiple universally administered MAC identifiers, and reserving a second, different from the first, universally administered MAC identifier from the multiple universally administered MAC identifiers. Where the first universally administered MAC identifier and the second universally administered MAC identifier are associated with a first and second resource of the network-interface-device respectively. The MAC identifier is then assigned to one of the first resource or the second resource is activated. Other aspects include apparatus logics (including programmed general purpose logic, custom circuitry, or any combination thereof) and program products (for example, tangible computer-readable media storing program code) that can be read and executed by a CPU or other programmed general purpose logic (for example a computer) to perform the method.

Figure 1:
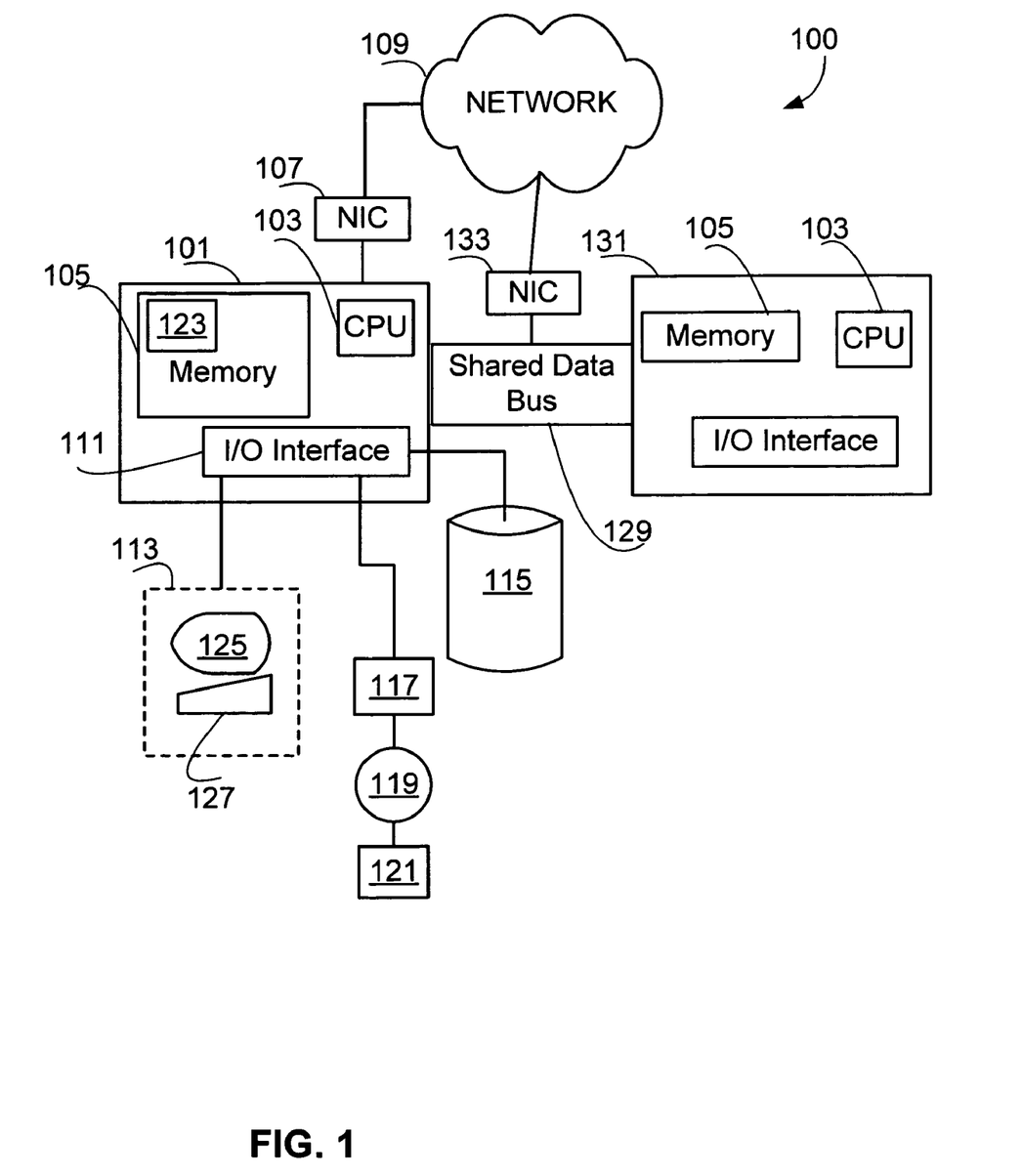
FIG. 1 illustrates a networked computer system uses the disclosed technology.

FIG. 1 illustrates a networked computer system 100 that can incorporate an embodiment. The networked computer system 100 includes a computer 101 that incorporates a CPU 103, a memory 105, and a network interface-device 107. The network interface-device 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media)) that typically contains a program product 121. The user interface device(s) 113 can include a display device 125 and a user-input device(s) 127. The storage system 115 (along with the removable data device 117), the computer-usable data carrier 119, and (in some cases the network 109) comprise a file storage mechanism. The program product 121 on the computer-usable data carrier 119 is generally read into the memory 105 as an advanced host network interface device driver program 123 which instructs the CPU 103 to perform specified operations. In addition, the program product 121 can be provided from devices accessed using the network 109. One skilled in the art will understand that not all of the displayed features of the computer 101 need to be present for the all embodiments that implement the techniques disclosed herein.

The computer 101 can be connected to a shared data bus 129 (that is shared with a second computer 131). The shared data bus 129 can support a shared network interface card 133. The shared network interface card 133 either must be in promiscuous mode, have two network ports each with a unique universally administered MAC identifier, or use the subsequently disclosed technology to accept data packets from a single port that is associated with at least two active MAC identifiers.

The problem addressed by the technology described herein can also exist in a single processor system (say the computer 101) that includes more than one separately identifiable networked resource accessed through a single port to the network.

Figure 2:
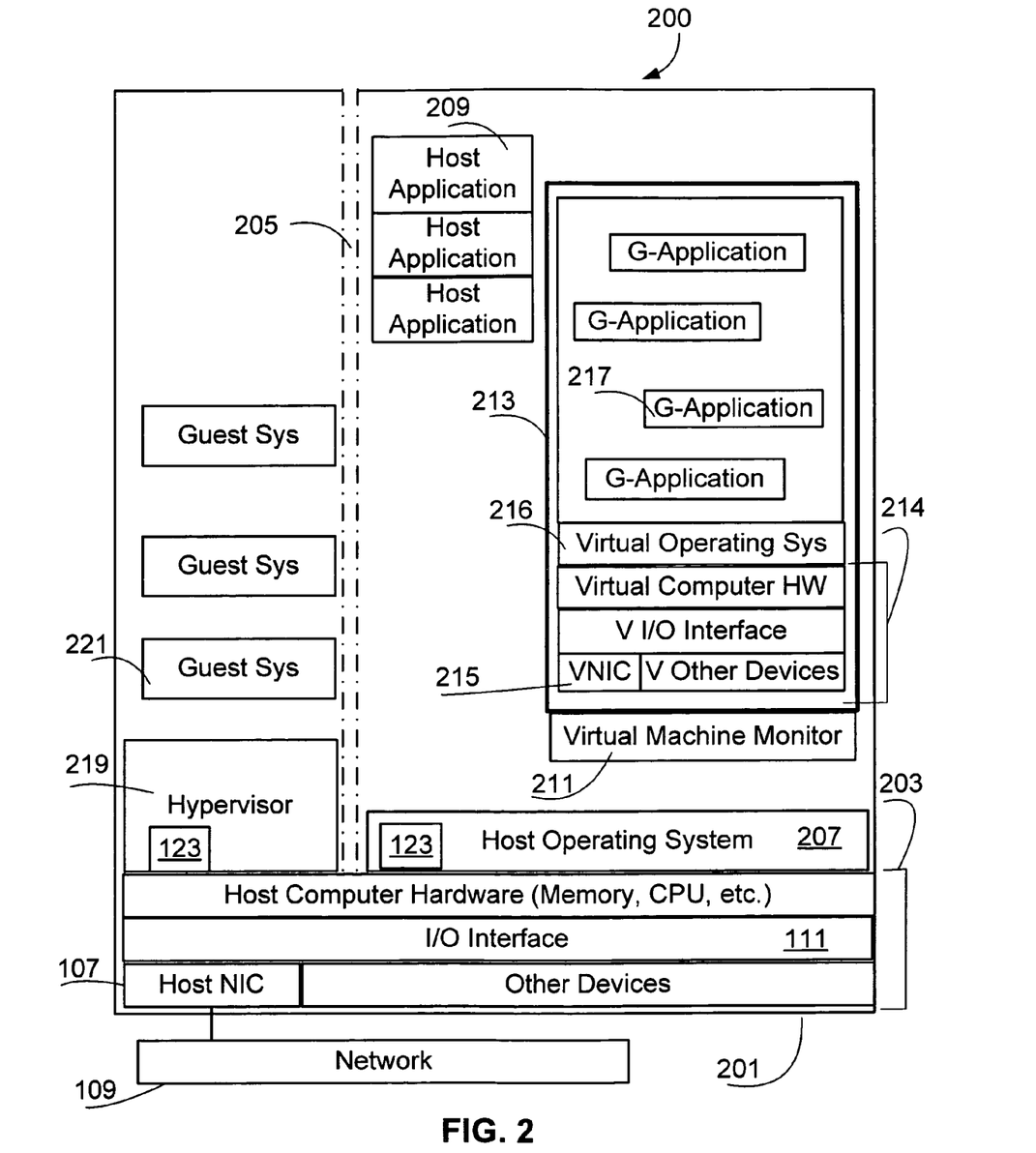
FIG. 2 illustrates a virtualized computing environment architecture that uses the disclosed technology.

FIG. 2 illustrates virtualized computing environment architectures 200 that can also use the technology disclosed herein. The technology can be incorporated within a computer system 201 that includes a tangible computer processor 203 that can include the network interface-device 107 to access the network 109, the I/O interface 111 and etc. that have been previously discussed. Programs executing on the tangible computer processor 203 can take at least two configurations. The two configurations are separated by a configuration separator 205. The underlying tangible computer processor 203 can be the same for each configuration. But in one configuration the tangible computer processor 203 executes a hypervisor to support virtualized computer environments, while in the other configuration a virtual machine monitor that executes as an operating-system-controlled application supports the virtualized computer environments.

The right-hand-side of the configuration separator 205 illustrates a virtual machine monitor configuration executed by the tangible computer processor 203 that uses a host operating system 207 to manages the memory, I/O, etc of the tangible computer processor 203 in a manner well known to one skilled in the art. As part of, and/or working in conjunction with, the host operating system 207 is the advanced host network-interface-device driver program 123 that contains instructions executed by the tangible computer processor 203 to perform the methods of the technology disclosed herein. The host operating system 207 allocates resources and/or provides services to a host application program 209 (one of which is labeled). One of the host application programs can be a virtual machine monitor 211 that emulates a virtual machine environment 213 such that the resources of a virtual computer 214 (including virtual devices such as a virtual network-interface-device 215) can be managed by a virtual operating system 216. Executing within the virtual machine environment 213 and under control of the virtual operating system 216 can be one or more applications such as a guest application 217.

One skilled in the art will understand that the host application program 209 and the virtual machine environment 213 are both controlled and serviced by the host operating system 207 to, for example, provide for the allocation of host memory and schedule execution by the tangible computer processor 203. Within the constraints of the resources allocated to the virtual machine monitor 211 by the host operating system 207, the virtual operating system 216 controls the resources and execution of the guest applications including access to devices, networks, files and/or other resources. As the virtual operating system 216 initializes the virtual network-interface-device 215 the virtual machine monitor 211 invokes capabilities in the advanced host network-interface-device driver program 123 of the network interface-device 107 as will be subsequently described.

Another example virtualized computing environment configuration that can be executed by the tangible computer processor 203 is shown on the left-hand-side of the configuration separator 205. In this configuration, a hypervisor 219 (that contains the advanced host network-interface-device driver program 123) provides resource support for virtual computers such as a guest computer system 221.

There are many other possible configurations that support virtualized computing environments. The technology described herein can be applied to any of these and in particular can be applied to diagnostic programs, test environments, configuration environments, hot backup environments etc.

For the rest of this document, the term "hypervisor" will include any hardware resource management program such as an operating system, diagnostic, or stand-alone program in an embedded system.

The technology disclosed herein treats the available MAC identifiers within a network-interface-device as a resource (one skilled in the art will understand that one example of a network-interface-device is a Network Interface Card (NIC)). An entity (for example, a device, a computer, a specialized circuit, and/or executing program, etc.) that needs to use the network-interface-device first determines whether the network-interface-device has an available resource and, if so, reserves the resource, uses the resource, and, when no longer needed, releases the resource. Thus, the entity that reserves the resource has complete responsibility for that resource. No other entity can access that resource. Where the network-interface-device is a network interface card, the disclosed technology prevents "MAC address stealing" from underneath a "virtual NIC". If some entity needs to modify a reserved MAC identifier, that entity must coordinate with the reserving entity to do so.

Figure 3:
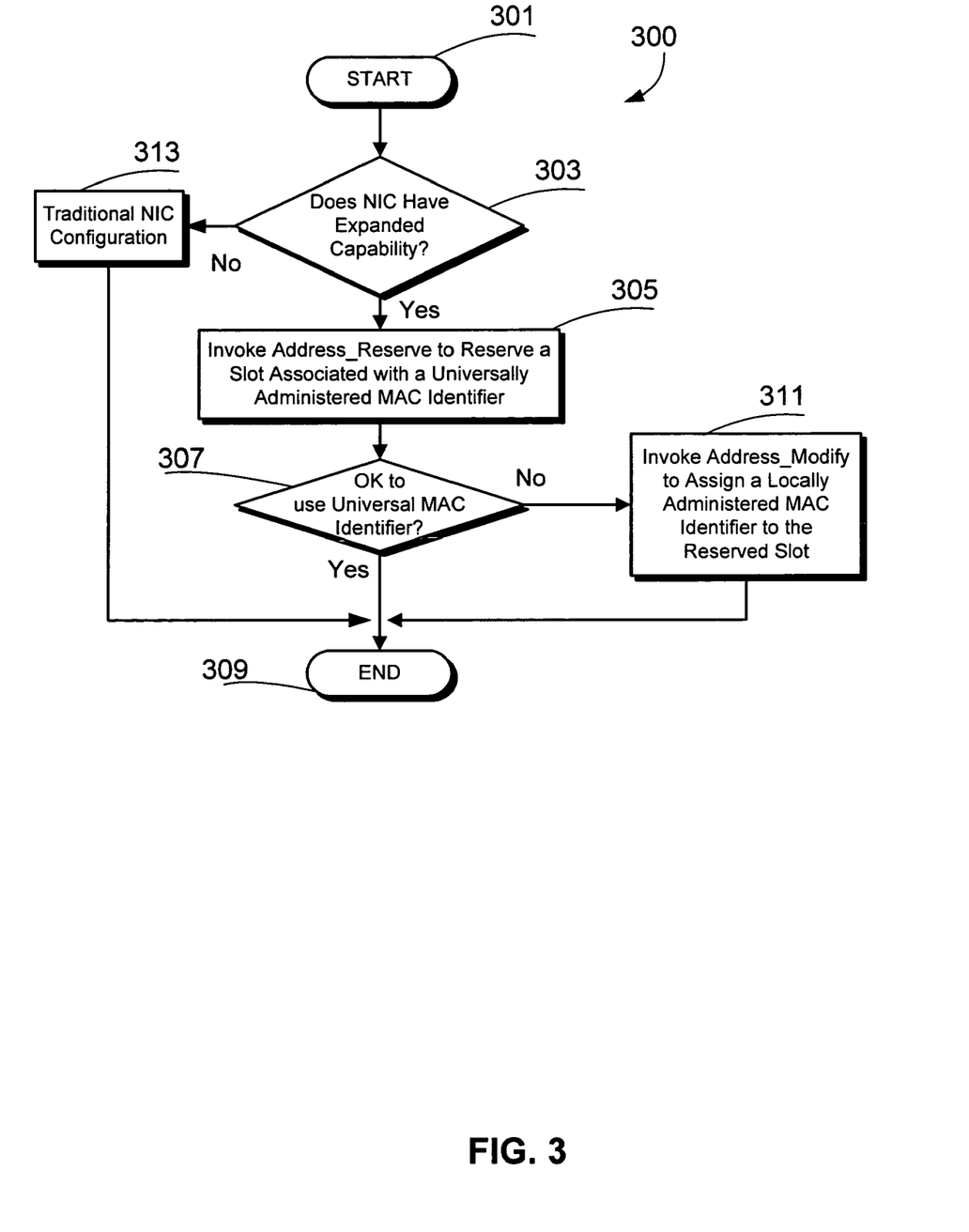
FIG. 3 illustrates a virtual-host network-interface-device association process used in one embodiment.

FIG. 3 illustrates a virtual-host network-interface-device association process 300 that enables a virtual network-interface-device in a virtualized computing environment to use one of a set of universally administered MAC identifiers in a suitably capable host network-interface-device. The virtual-host network-interface-device association process 300 can be invoked by a virtual network-interface-device as it is initialized by the guest operating system or hypervisor. The virtual-host network-interface-device association process 300 is used to condition a network-interface-device to use a unique active MAC identifier for network communications to and from the virtual computer.

The host network-interface-device is interfaced to a network through a port and, if suitably capable, includes a set of universally administered MAC identifiers. The host network-interface-device also has a set of slots. Each slot associates a resource with an active MAC identifier (which can be a universally administered MAC identifier, a spoofed/cloned universally administered MAC identifier, or a locally administered MAC identifier). The resource can be, for example, hardware or software executing on a computer that performs some operation on receiving a data packet containing the active MAC identifier. If the resource emits a data packet onto the network the source address in the data packet will be set to the active MAC identifier associated with the resource via the slot. In addition, the host network-interface-device is conditioned to accept any data packet received through the port if the data packet contains a destination address that matches any one of a set of active MAC identifiers in an accept filter even if the host network-interface-device is not in promiscuous mode.

A guest operating system can include a virtual network-interface-device as a resource. The guest operating system (or hypervisor) initializes the virtual network-interface-device and invokes the virtual-host network-interface-device association process 300 to associate the virtual network-interface-device (the resource) with a slot in the host network-interface-device.

The slot also associates an active MAC identifier with the resource such that data packets emitted onto the network for the resource will have the source address of the active MAC identifier associated with the resource. In addition, the host network-interface-device will accept data packets that have a destination address that match any of the active MAC identifiers. The accepted data packets will be dispatched to the resource associated with the slot/active MAC identifier (for example to the virtual network-interface-device). Thus, the slots associate a resource and its active MAC identifier.

Thus, the multiple MAC identifiers associated with the port can identify separate resources in, or associated with, the network-interface-device.

Where the network-interface-device is a NIC each slot generally associates a resource that will source and/or sink data packets. Furthermore, if the network-interface-device provides some other service or capability that can be invoked by receipt of a data packet, that service can be associated with a specific active MAC identifier.

The virtual-host network-interface-device association process 300 initiates at a 'start' terminal 301 when invoked by a hypervisor and continues to a 'NIC feature' decision process 303 that can invoke the Address_Support procedure (subsequently described with respect to FIG. 4) to verify that the network-interface-device has a 'multiple universally administered MAC identifier capability' that allows multiple active MAC identifiers to be associated with a port. If this capability exists, the virtual-host network-interface-device association process 300 continues to a 'reserve MAC address' process 305 that can (for example) invoke the Address_Reserve procedure (subsequently described with respect to FIG. 5) to reserve one of the available slots in the network-interface-device.

If the network-interface-device is configured to automatically activate a universally administered MAC identifier when a slot is reserved, the network-interface-device will associate one of its set of universally administered MAC identifiers with the slot and add that associated MAC identifier to the accept filter within the host network-interface-device. Thus, the host network-interface-device will start accepting data packets that have the active MAC identifier in the destination field. In embodiments where the network-interface-device only reserves a slot and returns a universally administered MAC identifier from the set of universally administered MAC identifiers, the virtual-host network-interface-device association process 300 will explicitly activate the provided MAC identifier for the slot (as is subsequently described with respect to FIG. 7).

Next the virtual-host network-interface-device association process 300 continues to an 'overwrite MAC' decision process 307 that determines (responsive to explicit programming, system preference, etc.) whether the host network-interface-device is to associate a universally administered MAC identifier or a locally administered MAC identifier with the slot. If the universally administered MAC identifier is to be used (and if the network-interface-device is configured to automatically add the associated universally administered MAC identifier to the accept filter), the virtual-host network-interface-device association process 300 returns the reserved slot and its associated universally administered MAC identifier as it completes through an 'end' terminal 309.

However, if at the 'overwrite MAC' decision process 307, the decision is to associate a locally administered MAC identifier with the slot instead of a universally administered MAC identifier, the virtual-host network-interface-device association process 300 invokes a 'specify locally administered MAC' process 311 to associate the locally administered MAC identifier with the slot which will cause the locally administered MAC identifier to be added to the accept filter such that the network-interface-device will start recognizing data packets addressed with that locally administered MAC identifier. One skilled in the art after reading the disclosure herein will also understand that a spoofed/cloned universally administered MAC identifier can be used instead of the locally administered MAC identifier.

Looking now at the 'NIC feature' decision process 303. If the network-interface-device does not have the expanded capability previously described, the virtual-host network-interface-device association process 300 continues to a 'traditional network-interface-device configuration' process 313 that uses previously known methods for conditioning the network-interface-device to accept data packets intended for the virtual network-interface-device. This requires that the traditional network-interface-device be placed into promiscuous mode so that it will accept all data packets and its associated driver or deamon will distribute the received data packets to each of the active virtual computers. Other well known techniques are used to emit packets on the network that have the correct source MAC identifier.

If the network-interface-device has the multiple universally administered MAC identifier-per-port capability, subsequent operation of the virtual-host network-interface-device association process 300 will reserve additional slots with their respective universally administered MAC identifiers and remove the reserved slot/universally administered MAC identifier from an available slot pool. Each of the reserved universally administered MAC identifiers is unique.

Figure 4:
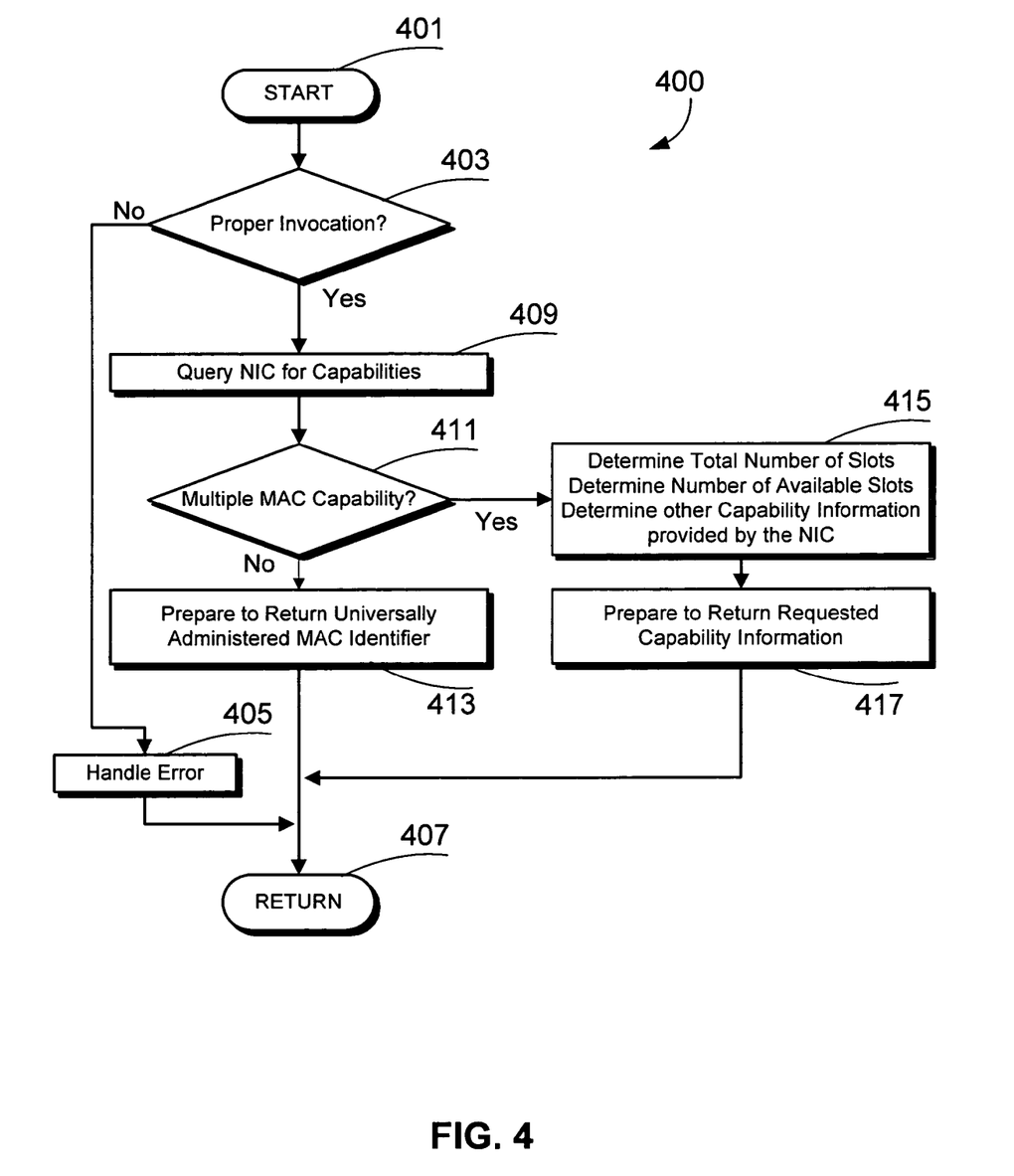
FIG. 4 illustrates one embodiment of an Address_Support process.

FIG. 4 illustrates an Address_Support process 400 that can be invoked by the hypervisor to obtain information about the host network-interface-device. The Address_Support process 400 initiates at a start terminal 401, and continues to a 'well-formed invocation' decision procedure 403 that validates any parameters provided in the invocation and performs any required initialization. If the provided parameters are not valid and/or the Address_Support process 400 cannot initialize, the Address_Support process 400 continues to an 'error handler' procedure 405 that performs any required event/error logging and associated recovery. The Address_Support process 400 then completes through a return terminal 407.

If the 'well-formed invocation' decision procedure 403 determines that the parameters are valid the Address_Support process 400 continues to a 'query network-interface-device capabilities' procedure 409 that acquires data defining the capabilities of the host network-interface-device either from the host network-interface-device itself or from other data sources that can provide the information (such as a database). Once the capabilities of the host network-interface-device are determined, the Address_Support process 400 continues to a 'multiple MAC capability' decision procedure 411 that examines these capabilities to determine whether multiple universally administered MAC identifiers were "burned-into" the host network-interface-device.

If only a single universally administered MAC identifier was burned-into the network-interface-device, the Address_Support process 400 continues to a 'prepare return of universally administered MAC' procedure 413 that obtains the assigned universally administered MAC identifier from the network-interface-device or from the previously obtained capabilities and prepares that information for return to the hypervisor such that the hypervisor will be able to place the network-interface-device into promiscuous mode and prepare to distribute data packets to guest operating systems using well known techniques. Next the Address_Support process 400 continues to the return terminal 407 to return the prepared information.

One skilled in the art will understand that other embodiments can return a failure status instead of returning the single universally administered MAC identifier of the traditional network-interface-device. In such embodiments the 'prepare return of universally administered MAC' procedure 413 is not needed and the Address_Support process 400 returns a failure status to indicate that the network-interface-device does not include a set of universally administered MAC identifiers.

If the 'multiple MAC capability' decision procedure 411 determines that the network-interface-device includes multiple universally administered MAC identifiers, the Address_Support process 400 continues to an 'obtain capability information from NIC' procedure 415 that further queries the network-interface-device (unless the information of interest is already provided by the 'query network-interface-device capabilities' procedure 409) for the total number of slots, the number of available slots, and other capabilities of the network-interface-device that may be of interest. Once the capability information is determined, a 'prepare return of capability information' procedure 417 prepares the information to be passed back to the hypervisor.

Figure 5:
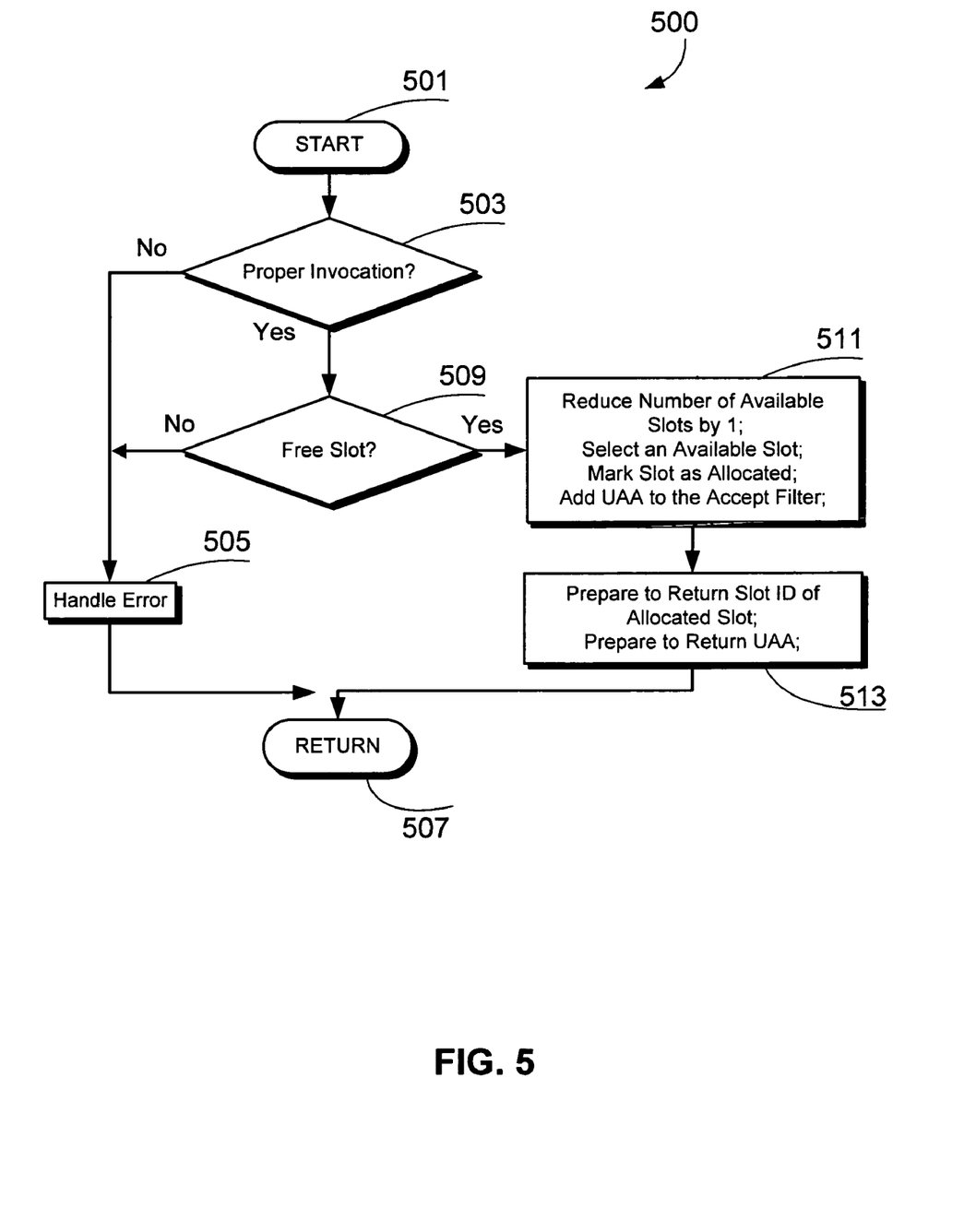
FIG. 5 illustrates one embodiment of an Address_Reserve process.

FIG. 5 illustrates an Address_Reserve process 500 that can be invoked by the hypervisor to reserve a slot in the host network-interface-device. The Address_Reserve process 500 initiates at a start terminal 501 and continues to a 'well-formed invocation' decision procedure 503 that validates any parameters provided in the invocation and performs any required initialization. If the provided parameters are not valid or the Address_Reserve process 500 cannot initialize, it continues to an 'error handler' procedure 505 that performs any required event/error logging and associated recovery and the Address_Reserve process 500 then completes through a return terminal 507.

If the 'well-formed invocation' decision procedure 503 determines that the parameters are valid the Address_Reserve process 500 continues to a 'free slot' decision procedure 509 that determines whether there is at least one slot that has not been reserved. If no slot is available, the Address_Reserve process 500 continues to the 'error handler' procedure 505 for processing as previously described.

If, at the 'free slot' decision procedure 509, a slot is available, the Address_Reserve process 500 continues to a 'reserve slot' procedure 511 that reserves one of the available slots as well as one of the available universally administered MAC identifiers. Next a 'prepare return of slot identifier and MAC information' procedure 513 prepares the return information. The return information comprises the slot identifier for the resource and can include the MAC identifier activated for that slot.

In some embodiments, as the slot is reserved, any one of the universally administered MAC identifiers from the available slot pool of burned-in identifiers is reserved. In other embodiments, a specific universally administered MAC identifier that is assigned to the slot is reserved.

As each resource attempts to access the host network-interface-device it receives a slot that associates a specific MAC identifier to the resource. For example, when two resources need to use the host network-interface-device, a separate slot and universally administered MAC identifier is assigned to each resource responsive to a resource-access request. In some embodiments the universally administered MAC identifier is automatically activated by adding it to the accept filter. In some embodiments the universally administered MAC identifier is returned to the hypervisor (to be replaced by a spoofed/cloned universally administered MAC identifier, or locally administered MAC identifier, or used as is) for explicit activation as is subsequently described with respect to FIG. 7.

In some embodiments the Address_Reserve process 500 can be invoked multiple times by a hypervisor or other computer program, or invoked multiple times by separate programs. Thus, the hypervisor can support multiple virtual network-interface-devices (multiple resources) by invoking the Address_Reserve process 500 as each virtual network-interface-device is initialized and thus reserves a slot for the resource that associates an active MAC identifier in the host network-interface-device with the resource.

In some embodiments the Address_Reserve process 500 can be invoked by different applications (or computers such as illustrated in FIG. 1) such as a diagnostic, an operating system, a hypervisor, and a Solaris Zone/Container.

One skilled in the art will understand that the association between slots and universally administered MAC identifier can be created at the time the universally administered MAC identifier are burned into the network-interface-device, or can be dynamically associated at the time a slot is reserved.

If the network-interface-device has the multiple universally administered MAC identifier-per-port capability, subsequent operation of the Address_Reserve process 500 will reserve additional slots with their respective universally administered MAC identifiers and remove the reserved slot/universally administered MAC identifier from the available slot pool. Each of the reserved universally administered MAC identifiers is unique.

Figure 6:
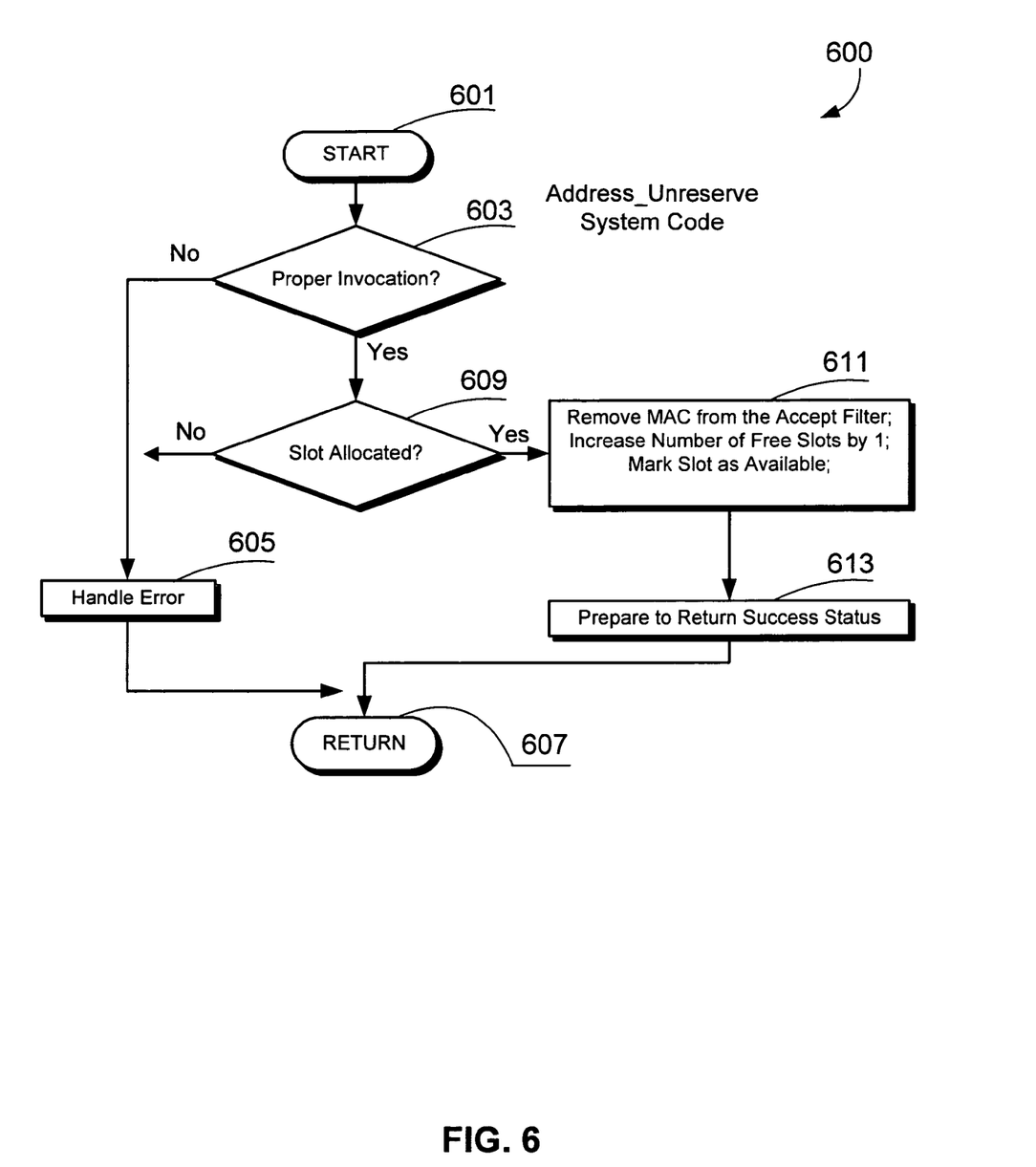
FIG. 6 illustrates one embodiment of an Address_Unreserve process.

FIG. 6 illustrates an Address_Unreserve process 600 that can be invoked by the hypervisor in response to a resource becoming disabled or dismounted (for example, by termination of a guest operating system, hypervisor, diagnostic, application program, etc. that uses the resource). The Address_Unreserve process 600 initiates at a start terminal 601, and continues to a 'well-formed invocation' decision procedure 603 that validates any parameters provided in the invocation and performs any required initialization. If the provided parameters are not valid, the Address_Unreserve process 600 continues to an 'error handler' procedure 605 that performs any required event/error logging, associated recovery, preparation for return of failure status, and then the Address_Unreserve process 600 completes through a return terminal 607. The provided parameter is the slot identifier obtained by the Address_Reserve process 500 of FIG. 5.

If the 'well-formed invocation' decision procedure 603 determines that the parameters are valid the Address_Unreserve process 600 continues to a 'reserved slot' decision procedure 609 that determines whether the slot identifier references a reserved slot. If the slot identifier does not references a reserved slot, the Address_Unreserve process 600 continues to the 'error handler' procedure 505 for processing as has been previously described.

If, at the 'reserved slot' decision procedure 609, the provided slot identifier references a reserved slot, the Address_Unreserve process 600 continues to a 'release slot' procedure 611 that removes the MAC identifier (if any) associated with the slot from the accept filter (thus, the network-interface-device will no longer accept data packets identified by that MAC identifier); increases the number of free slots by one, and marks the slot as being available. Next, a 'prepare return success status' procedure 613 prepares the return information (generally a success status) and the Address_Unreserve process 600 completes through the return terminal 607.

Figure 7:
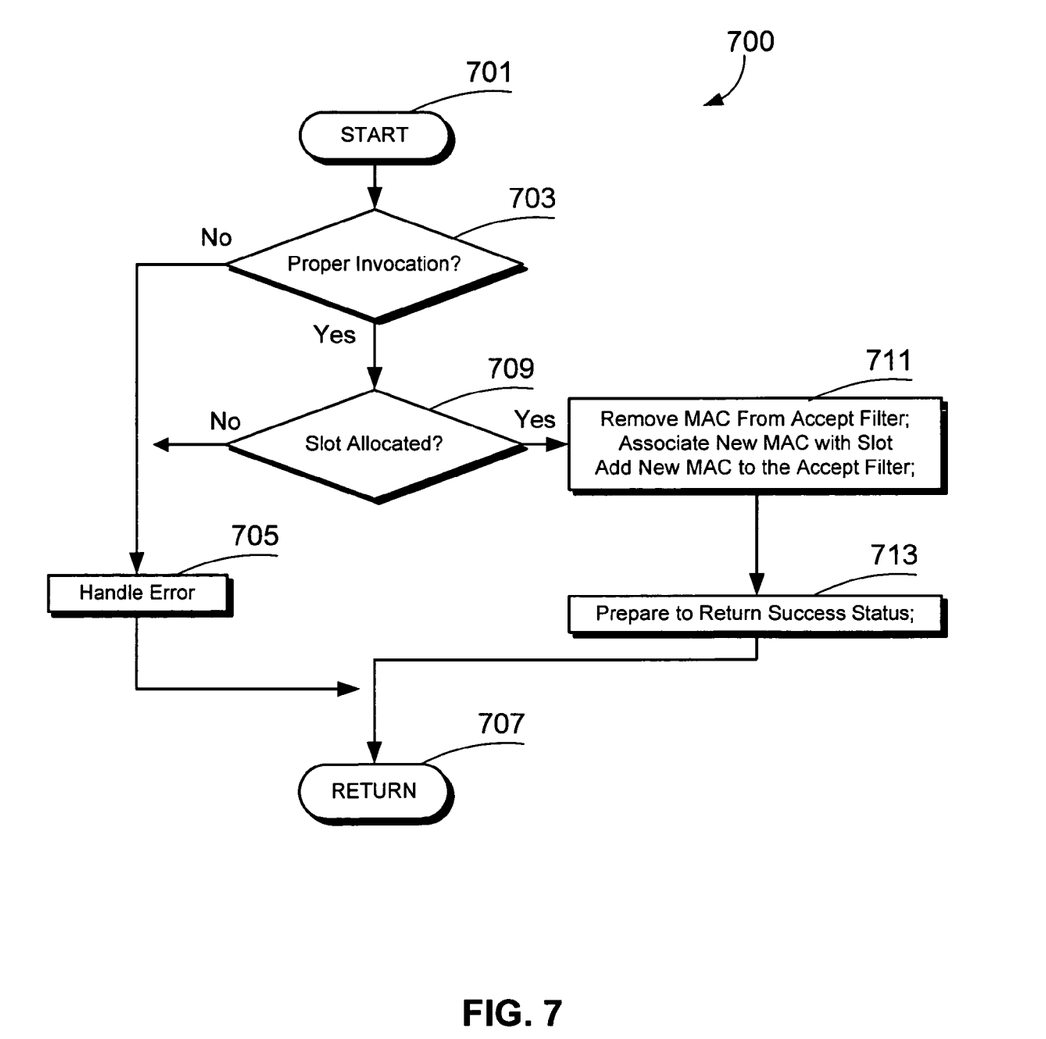
FIG. 7 illustrates one embodiment of an Address_Modify process.

FIG. 7 illustrates an Address_Modify process 700 that can be invoked by the hypervisor to change the active MAC identifier associated with a slot. The Address_Modify process 700 initiates at a start terminal 701, and continues to a 'well-formed invocation' decision procedure 703 that validates any parameters provided in the invocation and performs any required initialization. If the provided parameters are not valid, the Address_Modify process 700 continues to an 'error handler' procedure 705 that performs any required event/error logging, associated recovery, preparation for return of failure status, and then the Address_Modify process 700 completes through a return terminal 707. The parameters include a slot identifier and can include a MAC identifier (such as the universally administered MAC identifier, a locally administered MAC identifier or a spoofed/cloned universally administered MAC identifier).

If the 'well-formed invocation' decision procedure 703 determines that the parameters are valid, the Address_Modify process 700 continues to a 'reserved slot' decision procedure 709 that determines whether the slot identifier has been reserved. If the specified slot has not been reserved, the Address_Modify process 700 continues to the 'error handler' procedure 705 and returns through the return terminal 707 as has been previously described.

However, if the slot has been reserved, the Address_Modify process 700 continues to an 'assign MAC identifier' procedure 711 that first removes the MAC identifier that has been associated with the specified slot (if any) from the accept filter, associates the locally administered MAC identifier with the specified slot and adds the new MAC identifier to the accept filter such that the network-interface-device will now accept data packets addressed to the new MAC identifier instead of the MAC identifier previously associated with the slot. Thus, the Address_Modify process 700 changes the active MAC identifier for a specified slot.

The Address_Modify process 700 then continues to a 'prepare return of success status' procedure 713 to prepare status indicating success, and then completes through the return terminal 707.

Figure 8:
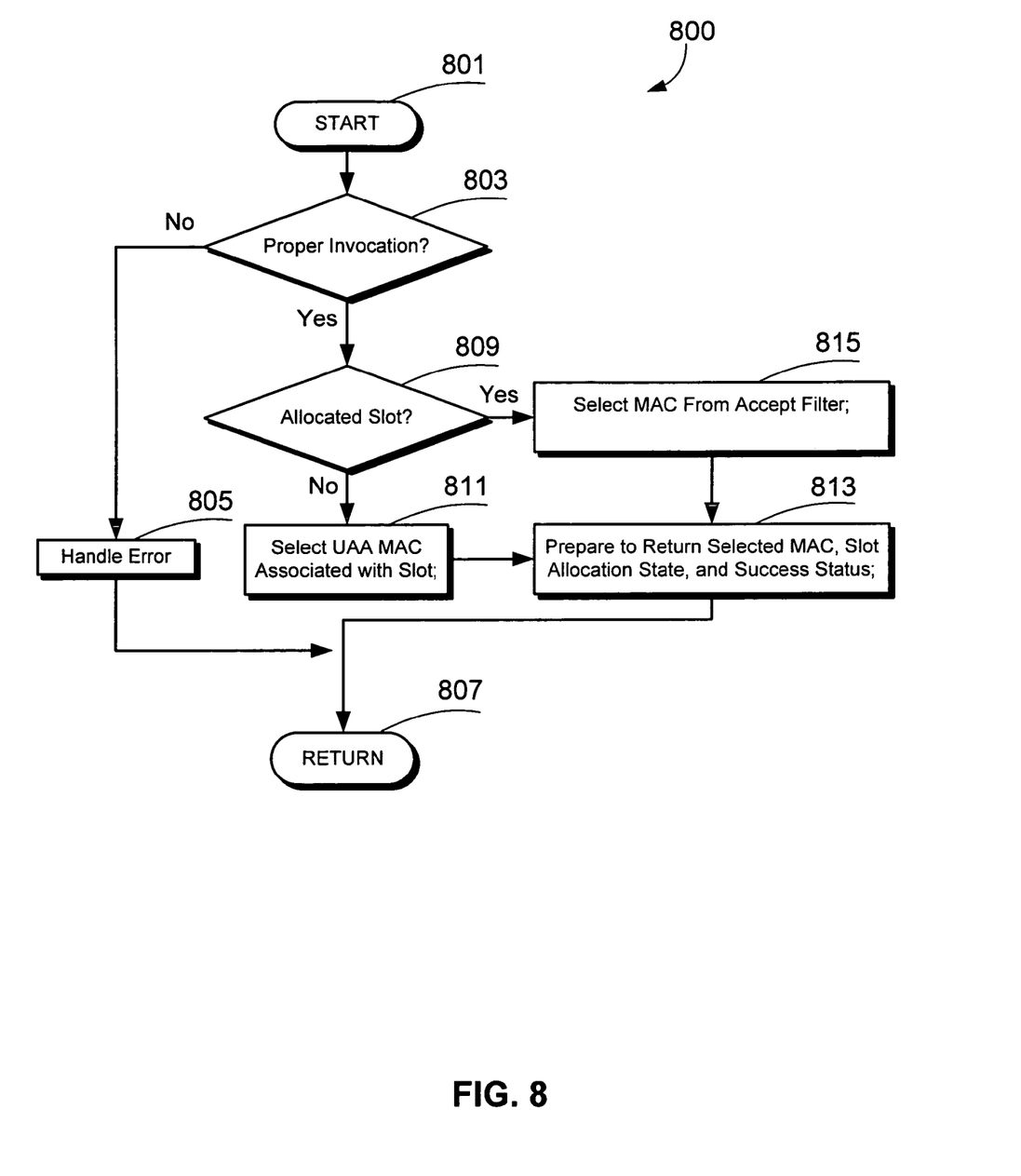
FIG. 8 illustrates one embodiment of an Address_Get process.

It is sometimes advantageous to determine what MAC identifier is assigned to a slot. FIG. 8 illustrates an Address_Get process 800 that can be invoked by the hypervisor to obtain a slot's MAC identifier. The Address_Get process 800 initiates at a start terminal 801, and continues to a 'well-formed invocation' decision procedure 803 that validates any parameters provided in the invocation and performs any required initialization. If the provided parameters are not valid, the Address_Get process 800 continues to an 'error handler' procedure 805 that performs any required event/error logging, associated recovery, and preparation for return of failure status. The Address_Get process 800 then completes through a return terminal 807. The parameters can include a slot identifier.

If the 'well-formed invocation' decision procedure 803 determines that the parameters are valid, the Address_Get process 800 continues to a 'slot reserved' decision procedure 809 that determines whether the slot is currently reserved. If the slot has not been reserved, the Address_Get process 800 continues to a 'select universally administrated MAC address' procedure 811 that selects the universally administered MAC identifier that has been "burned-in" by the manufacturer for that slot (for network-interface-devices that have a set of universally administered MAC identifiers that can be dynamically reserved for the slots, the 'select universally administrated MAC address' procedure 811 can select a range of universally administered MAC identifiers for return). Once the universally administered MAC identifier(s) has been selected for return, the Address_Get process 800 continues to a 'prepare return of selected MAC address' procedure 813 that prepares the selected MAC identifier(s), the slot allocation state, and success status and then returns through the return terminal 807 as has been previously described.

If at the 'slot reserved' decision procedure 809 the slot is allocated, the Address_Get process 800 continues to a 'select MAC from accept-filter' procedure 815 that retrieves the active MAC identifier associated with the slot (if any) and continues to the 'prepare return of selected MAC address' procedure 813 for prepare the active MAC identifier for return as previously described.

One skilled in the art will understand that the allocation of portions of the work between the host network-interface-device and procedures on the tangible computer processor 203 is a design detail. The technology disclosed herein assumes an accept filter, and some process to associate a resource and/or slot with an active MAC identifier in the accept filter. The technology also assumes that the accept filter can hold two or more active MAC identifiers, and that the accept filter interfaces to the network through a port such that the port can accept data packets having different unique MAC identifiers without being in promiscuous mode.

One skilled in the art and after having read the disclosure herein will understand that the process of using the network-interface-device (that has the previously described capabilities) can be included with a diagnostic, an operating system, a hypervisor, and a Solaris Zone/Container. Such a one will also understand that in multi-processor embodiments (such as shown in FIG. 1) where a network-interface-device is shared between at least two of the processors, that each processor can reserve a slot for its own use.

In one embodiment an implementation of a software interface implements the previously disclosed technology. A software interface is a rule set that enables access to the desired functionality. In the programming context a software interface is commonly referred to as an Application Programming Interface (API). The subsequently described software interfaces can be implemented as programmed-procedures, as invocation of trap instructions, or any other API technique known in the art. One skilled in the art will understand that there are many substantially equivalent API designs that can be used for this purpose and that those described below are but one example of an API that would fall within the claimed subject matter.

In this embodiment, five software-interfaces are added to a host operating system or hypervisor to enable a virtual client to have access to a network interface card. These software-interfaces are:

1) "Address_Support",
2) "Address_Reserve",
3) "Address_Unreserve",
4) "Address_Get", and 5) "Address_Modify".

The Address_Support software-interface can query a network-interface-device to return capability information about the device. This capability information can include the total number of slots/universally administered MAC identifiers available to the network interface card, and the current number of slots that are available (those MAC identifiers in the available slot pool) as well as other information such as the starting and ending universally administered MAC identifiers.

The Address_Reserve software-interface can reserve one of the available slots from the available slot pool. The reserved slot is now "in use" and the associated universally administered MAC identifier is now the active MAC identifier for the reserved slot. The interface returns the reserved slot identifier and its associated universally administered MAC identifier. The network interface card can add the reserved universally administered MAC identifier to the accept filter when the reserve slot identifier is returned. Thus data packets that are directed to a MAC identifier that matches one of the active MAC identifiers in the accept filter will be received by the network interface card and passed to the host operating system/hypervisor. The slot identifier can be used by the Address_Unreserve interface to return the slot to the available slot pool and to remove the associated active MAC identifier from the accept filter.

The Address_Unreserve software-interface can use the slot identifier (provided to the host operating system by the Address_reserve interface) to return the slot to the available slot pool. This removes the active MAC identifier from the accept filter and also makes the universally administered MAC identifier currently associated with the slot available for subsequent use. Thus, data packets directed to the newly released MAC identifier are no longer recognized by the network interface card and are ignored in the course of normal operation of the network interface card. Note that the active MAC identifier removed from the accept filter need not be the universally administered MAC identifier associated with the slot identifier because subsequent software-interface operations may have overridden the universally administered MAC identifier with a locally administered MAC identifier or a spoofed/cloned universally administered MAC identifier.

The Address_Modify software-interface can use the slot identifier provided to the host operating system by the Address_Reserve interface and a MAC identifier (such as a locally administered MAC identifier, a spoofed/cloned universally administered MAC identifier or a universally administered MAC identifier provided by the network interface card to allow a virtual client to specify a MAC identifier for the specified slot. The network interface card can remove the existing active MAC identifier associated with the slot identifier from the accept filter, and can add the provided MAC identifier to the accept filter.

The Address_Get software-interface can receive the slot identifier and in response returns the active MAC identifier in the accept filter associated with the specified slot identifier. In some embodiments, if the slot is not reserved, this software-interface can return the universally administered MAC identifier associated with the specified slot identifier. The software-interface can also provide the relevant reservation status.

One embodiment of the technology is subsequently described.

When the guest operating system initializes a virtual network-interface-device it triggers the hosting hypervisor to allocate a resource. In one embodiment the hypervisor can execute programmed procedures that are consistent with the following pseudo code:

```
Mac_address active_mac;
Mac_address uaa_mac;
Int resource_slot;
If not Address_Reserve(\dev\nic, uaa_mac, resource_slot) {
    raise no_resource_err;
}
active_mac = uaa_mac;
```

In this embodiment, Address_Reserve returns a boolean value to indicate whether the specified NIC was able to reserve a universally administered MAC identifier. If the NIC was unable to reserve a MAC (for example, if no entries are left in the available slot pool), Address_Reserve returns a FALSE and the hypervisor posts an error to indicate that the resource is not available (thus, a virtual network-interface-device would be marked as off-line, disabled, or the like). The universally administered MAC identifier associated with the slot is removed from the available slot pool and added to the accept filter. Thus, the universally administered MAC identifier becomes an active MAC identifier.

When the guest computer is turned off, or when the guest operating system disables the virtual network-interface-device, the hypervisor releases the active MAC identifier by:
Address_Unreserve(\dev\nic, resource_slot);

If the hypervisor is conditioned to use a locally administered MAC identifier (either by a request from the host operating system or by predefined preference or suchlike) the hypervisor can activate the requested MAC identifier by:

```
Active_mac = new_mac;
Address_Modify(\dev\nic, active_mac, resource_slot)
```

To acquire the active MAC identifier from the NIC for a particular slot, the hypervisor can execute:

```
active_mac = Address_Get(\dev\nic, resource_slot);
    To get status about the NIC, the hypervisor can execute:
Address_Support(\dev\nic, total_slots,available_slots,
recognized_macs( ));
```

One skilled in the art will understand that the available slot pool can be implemented as an unavailable slot pool with the appropriate logic transformations.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic. In particular, a first reservation logic, a second reservation logic, an assignment logic, activation logic and a locally administered MAC identifier assignment logic are such logics. In addition, one skilled in the art will understand, for example, that the first reservation logic and the second reservation logic need only differ by the input value provided to the logic and thus, a first invocation of a logic can be distinguished from a second invocation of the logic.

One skilled in the art will understand that the technology disclosed herein provides a novel solution to assigning MAC identifiers to a network-interface-device that has multiple universally administered MAC identifiers "burned-in" the device.

From the foregoing, it will be appreciated that the technology has (without limitation) the following advantages:

1) Efficient use of the network-interface-device in circumstances where promiscuous mode would normally be required because the network-interface-device can be configured to pass data packets having a destination address that matches any of a number of universally administered MAC identifiers or locally administered MAC identifiers.

2) The ability to configure offline Stand-by computers that have the EXACT same CompterName, IP, and MAC identifier as the Primary computers. Thus, if a Stand-by computer is placed online (replacing a primary computer), then absolutely no Address Resolution Protocol (ARP) refresh needed. Because the Stand-by computer is identical (from the network perspective) to the offline Primary computer, the Stand-by computer comes on-line sooner than with the previously known technology (and with less network overhead).

3) The ability to use a single NIC for virtualized computing environments while still using universally administered MAC identifiers for the virtualized computing environments.

4) In the situation where software operation is conditioned on the existence of a NIC that has a specific universally administered MAC identifier, the software can be installed on a second machine (for example a Stand-by system) with a different NIC.

5) Simplifies network diagnostics and testing platforms as a single NIC can be configured to emulate one or more traditional NICs. In addition, the ability to monitor a network for data packets addressed to a limited number of MAC identifiers improves the reliability of network monitors (because the NIC passes fewer data packets than does a traditional NIC in promiscuous mode; because the monitor is not overwhelmed with uninteresting data packets, it has a better chance of detecting the data packets of interest).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A computer controlled method for specifying a MAC identifier for a single network interface card, said single network interface card configured to connect to a network through a port, said single network interface card comprising a plurality of universally administered MAC identifiers, a subset of which are activated as active universally administered MAC identifiers, and wherein the single network interface card is configured to accept a data packet received through said port responsive to whether said data packet contains a destination address that matches one of the active universally administered MAC identifiers, said method comprising:

receiving a first and a second resource-access request, wherein each resource access request includes a request to associate a slot in the single network interface card with a hardware or software resource;

in response to a query sent to the single network interface card for each request, receiving information that indicates whether a slot is available in the single network interface card, wherein the information includes an indication whether the single network interface card can associate multiple universally administered active MAC identifiers with a port, the total number of slots in the single network interface card, and an indication whether the single network interface card has sufficient available slots to satisfy the resource-access requests;

in response to a first slot being available for the first resource-access request, reserving the first slot and a first universally administered MAC identifier from said plurality of universally administered MAC identifiers, wherein said first universally administered MAC identifier is associated with a first resource within said single network interface card;

in response to a second slot being available for the second resource-access request, reserving the second slot and a second universally administered MAC identifier, which is different from the first universally administered MAC identifier, from said plurality of universally administered MAC identifiers, wherein said second universally administered MAC identifier is associated with a second resource within said single network interface card, and wherein said first and second universally administered MAC identifiers are universally unique; and activating said first universally administered MAC identifier and said second universally administered MAC identifier to enable said single network interface card to accept a data packet containing a destination address that matches either said first universally administered MAC identifier or said second universally administered MAC identifier without said single network interface card being placed in a promiscuous mode.

2. The computer controlled method of claim 1, further comprising assigning a locally administered MAC identifier to said first resource or said second resource.

3. The computer controlled method of claim 1, wherein reserving said first universally administered MAC identifier is responsive to a first resource-access request made by a first host-computer application.

4. The computer controlled method of claim 3, wherein reserving said second universally administered MAC identifier is responsive to a second resource-access request made by said first host-computer application.

5. The computer controlled method of claim 3, wherein said first host-computer application is a hypervisor.

6. The computer controlled method of claim 1, wherein reserving said first universally administered MAC identifier is responsive to a resource-access request made by a first host-computer application and wherein reserving said second universally administered MAC identifier is responsive to a resource-access request made by a second host-computer application.

7. The computer controlled method of claim 1, wherein said first host-computer application is one of a group consisting of a diagnostic, an operating system, a hypervisor, and a Solaris Zone/Container.

8. The computer controlled method of claim 1, wherein said single network interface card is in communication with a shared data bus and wherein the shared data bus is in communication with a plurality of data processors, and wherein reserving said first universally administered MAC identifier is responsive to a first one of said plurality of data processors and wherein reserving said second universally administered MAC identifier is responsive to a second one of said plurality of data processors.

9. An apparatus configured to specify a MAC identifier for a single network interface card, said single network interface card configured to connect to a network through a port, said single network interface card comprising a plurality of universally administered MAC identifiers, a subset of which are activated as active universally administered MAC identifiers, wherein the single network interface card is configured to accept a data packet received through said port responsive to whether said data packet contains a destination address that matches one of the active universally administered MAC identifiers, and wherein said apparatus comprises:
 a receiving logic configured to receive a first and a second resource-access request, wherein each resource access request includes a request to associate a slot in the single network interface card with a hardware or software resource;
 a determining logic that is configured to send a query to the single network interface card for each request, wherein in response to the query, the determining logic is configured to receive information that indicates whether a slot is available in the single network interface card, wherein the information includes an indication whether the single network interface card can associate multiple universally administered active MAC identifiers with a port, the total number of slots in the single network interface card, and an indication whether the single network interface card has sufficient available slots to satisfy the resource-access requests;
 a first reservation logic configured to reserve a first slot and a first universally administered MAC identifier from said plurality of universally administered MAC identifiers in response to the first slot being available for the first resource-access request, wherein said first universally administered MAC identifier is associated with a first resource within said single network interface card;
 a second reservation logic configured to reserving a second slot and a second universally administered MAC identifier, which is different from the first universally administered MAC identifier, from said plurality of universally administered MAC identifiers in response to the second slot being available for the second resource-access request, wherein said second universally administered MAC identifier is associated with a second resource within said single network interface card, and wherein said first and second universally administered MAC identifiers are universally unique; and
 an activation logic configured to activate said first universally administered MAC identifier and said second universally administered MAC identifier responsive to the assignment logic to enable said single network interface card to accept a data packet containing a destination address that matches either said first universally administered MAC identifier or said second universally administered identifier without said single network interface card being placed in a promiscuous mode.

10. The apparatus of claim 9, further comprising a locally administered MAC identifier assignment logic configured to assign a locally administered MAC identifier to said first resource or said second resource.

11. The apparatus of claim 9, wherein the first reservation logic is responsive to a first resource-access request made by a first host-computer application.

12. The apparatus of claim 11, wherein the second reservation logic is responsive to a second resource-access request made by said first host-computer application.

13. The apparatus of claim 11, wherein said first host-computer application is a first guest operating system comprising a virtual network interface card.

14. The apparatus of claim 9, wherein the first reservation logic is responsive to a resource-access request made by a first host-computer application and wherein the second reservation logic is responsive to a resource-access request made by a second host-computer application.

15. The apparatus of claim 9, wherein said single network interface card is in communication with a shared data bus and wherein the shared data bus is in communication with a plurality of data processors, and wherein the first reservation logic is responsive to a first one of said plurality of data processors and wherein the second reservation logic is responsive to a second one of said plurality of data processors.

16. A tangible computer-readable media storing program code that, when executed by a computer, cause said computer to perform a method for specifying a MAC identifier for a single network interface card, said single network interface card configured to connect to a network through a port, said single network interface card comprising a plurality of universally administered MAC identifiers, a subset of which are activated as active universally administered MAC identifiers, wherein the single network interface card is configured to accept a data packet received through said port responsive to whether said data packet contains a destination address that matches one of the active universally administered MAC identifiers, said method comprising:
 receiving a first and a second resource-access request, wherein each resource access request includes a request to associate a slot in the single network interface card with a hardware or software resource;
 in response to a query sent to the single network interface card for each request, receiving information that indicates whether a slot is available in the single network interface card, wherein the information includes an indication whether the single network interface card can associate multiple universally administered active MAC identifiers with a port, the total number of slots in the single network interface card, and an indication whether the single network interface card has sufficient available slots to satisfy the resource-access requests;
 in response to a first slot being available for the first resource-access request, reserving the first slot and a first universally administered MAC identifier from said plurality of universally administered MAC identifiers, wherein said first universally administered MAC identifier is associated with a first resource within said single network interface card;
 in response to a second slot being available, reserving a second universally administered MAC identifier, which is different from the first universally administered MAC identifier, from said plurality of universally administered MAC identifiers, wherein said second universally administered MAC identifier is associated with a second resource within said single network interface card, and wherein said first and second universally administered MAC identifiers are universally unique; and activating said first universally administered MAC identifier and said second universally administered MAC identifier to enable said single network interface card to accept a data packet containing a destination address that matches either said first universally administered MAC identifier or said second universally administered identifier without said single network interface card being placed in a promiscuous mode.

17. The tangible computer-readable media of claim 16, wherein the method further comprising assigning a locally administered MAC identifier to said first resource or said second resource.

18. The tangible computer-readable media of claim 16, wherein reserving said first universally administered MAC identifier is responsive to a first resource-access request made by a first host-computer application.

19. The tangible computer-readable media of claim 18, wherein reserving said second universally administered MAC identifier is responsive to a second resource-access request made by said first host-computer application.

20. The computer controlled method of claim 1, further comprising:

assigning the first slot and the first universally administered MAC identifier to the first resource within said single network interface card; and assigning the second slot and the second universally administered MAC identifier to the second resource within said single network interface card.

21. The apparatus of claim 9, further comprising an assigning logic configured to:

assign the first slot and the first universally administered MAC identifier to the first resource within said single network interface card; and assign the second slot and the second universally administered MAC identifier to the second resource within said single network interface card.

22. The tangible computer-readable media of claim 16, wherein the method further comprising:

assigning the first slot and the first universally administered MAC identifier to the first resource within said single network interface card; and assigning the second slot and the second universally administered MAC identifier to the second resource within said single network interface card.

\* \* \* \* \*